Figure 1:
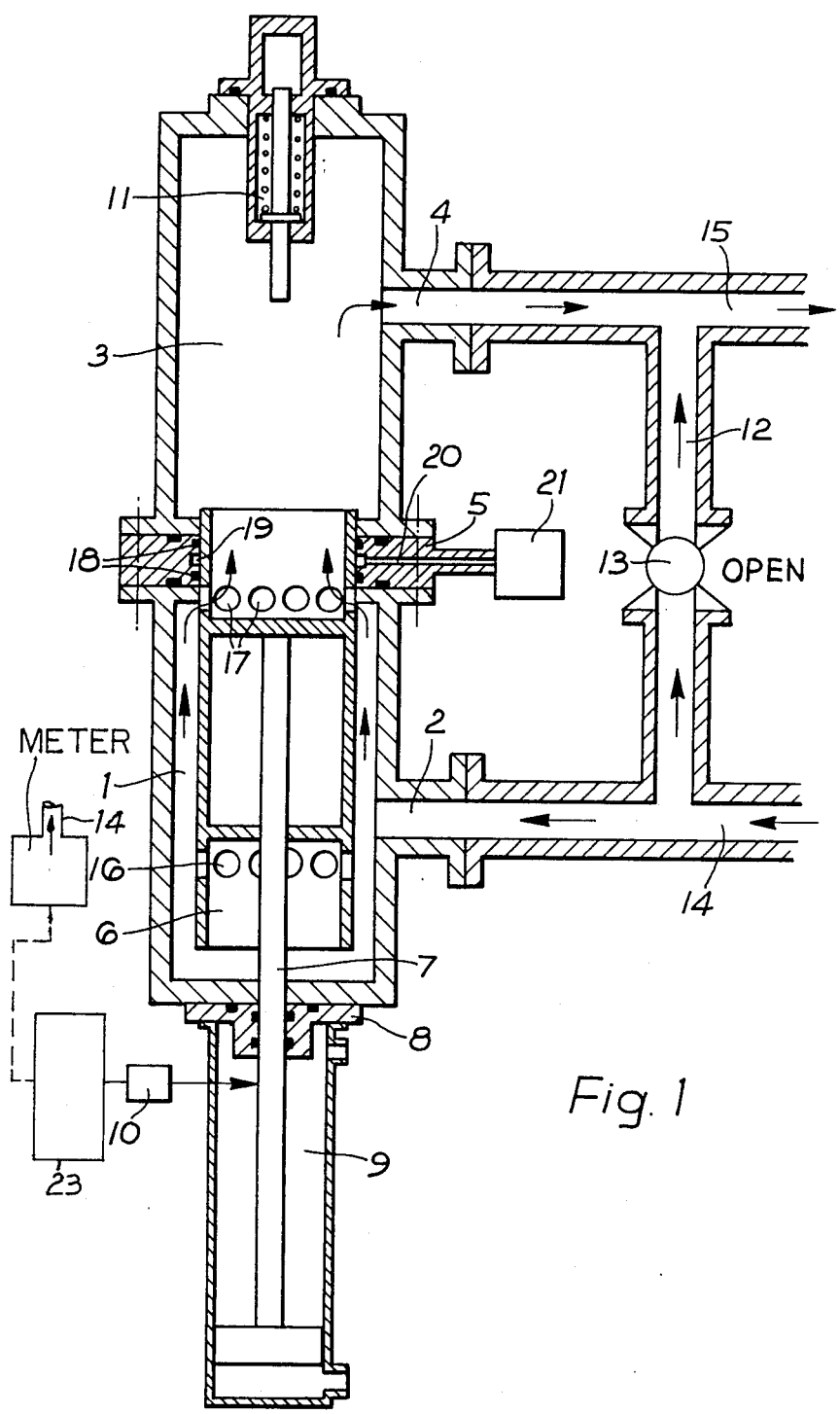

United States Patent [19]

Capper

[11] Patent Number: 4,718,267
[45] Date of Patent: Jan. 12, 1988

[54] METER PROVERS

[76] Inventor: Graham Capper, 15 Turnberry Way, Dinnington, Sheffield S31 7TA, England

[21] Appl. No.: 897,648

[22] Filed: Aug. 18, 1986

[51] Int. Cl.[4] .......................................... G01F 25/00
[52] U.S. Cl. ........................................................ 73/3
[58] Field of Search ................................... 73/3, 46, 47

[56] References Cited

U.S. PATENT DOCUMENTS

| | | | |
|---|---|---|---|
| 3,848,621 | 11/1974 | Dickenson | 73/3 |
| 4,517,823 | 5/1985 | Bohm | 73/3 |
| 4,549,426 | 10/1985 | Erickson | 73/3 |
| 4,627,267 | 12/1986 | Lohrs et al. | 73/3 |
| 4,628,724 | 12/1986 | Maurer | 73/3 |

FOREIGN PATENT DOCUMENTS 1420754   1/1976   United Kingdom ................ 73/3

*Primary Examiner*—Stewart J. Levy
*Assistant Examiner*—Robert R. Raevis
*Attorney, Agent, or Firm*—Trexler, Bushnell, Giangiorgi & Blackstone, Ltd.

[57] ABSTRACT

A meter prover comprises an upstream chamber (1) with a port (2) a downstream chamber (3) with a port (4) either port for connection to a meter (not shown) to be proved, a stationary seal (5) between the two chambers, a piston body (6) within and bridging the chambers, said piston body being in sealed sliding engagement with the stationary seal and having an outer diameter less than the minimum inside measurement across each chamber, an independent actuator (9) to initiate a proving run of the piston body (6) from one chamber to the other, a detector unit (10) for signalling the start and end of the proving run, and port openings (17) at at least one end of the piston body (6) providing fluid communication between the chamber prior to the onset of the proving run. The piston body (6) may be attached to a piston rod (7) which projects through a sealing means (8) at the end of at least one of the two chambers and is connected to the independent actuator (9) external of the chamber.

15 Claims, 6 Drawing Figures

METER PROVERS

This invention relates to meter provers for checking the accuracy of turbine and positive displacement flow meters particuarly in the petro-chemical industry.

Generally meter provers are relatively expensive pieces of equipment and the reliablity of any sealing arrangement within a prover is crucial but constant monitoring for any leakage can be difficult particularly when the sealing arrangement is on a moving part of the equipment.

The object of the present invention is to provide a relatively compact meter prover having a stationary seal arrangement capable of being readily checked for any leakage.

According to the present invention, a meter prover comprises an upstream chamber with a port, a downstream chamber with a port, either port for connection to a meter to be proved, a stationary seal between the two chambers, a piston body within and bridging the chambers, said piston body being in sealed sliding engagement with the stationary seal and having an outer diameter less than the minimum inside measurement across each chamber, an independent actuator to initiate a proving run of the piston body from one chamber to the other, a detector unit for signalling the start and end of the proving run, and port openings at at least one end of the piston body providing fluid communication between the chambers prior to the onset of the proving run.

The piston body may be attached to a piston rod which projects through a sealing means at the end of at least one of the two chambers and is connected to the independent actuator external of the chambers.

Preferably port openings are provided at the opposite end of the piston body, to provide fluid communication between the chambers at the end of the proving run. Thus the meter being proved may be used continually throughout the proving run.

The stationary seal may comprise a housing having two sealing rings sealing round the piston body and means are provided for detecting seal integrity between the stationary seal and the piston body which are comprised of a groove in the seal housing between the two sealing rings and a bore from the groove to a fluid indicator, which may be a pressure gauge or alternatively a pressure transducer connected to a remote display.

The independent actuator may be a double acting cylinder with a piston therein secured to the projecting end of the piston rod from the piston body. The piston rod may project from the upstream chamber, and a damper unit for the piston body may be provided at the remote end of the downstream chamber.

Alternatively the other end of the piston rod may project through the piston and through a seal arrangement in the downstream chamber and thus the detector unit may then be mounted selectively at either end of the meter prover to cooperate with that part of the piston rod at that end. This construction has the advantage of balancing the pressure in the complete assembly with the pressure drop through the prover being a function of the flow path and not the pipeline pressure as a multiple of the annulus area of the piston shaft. This construction also balances the flow through the prover in that the introduction of the fluid equivalent of the piston shaft coming into the system will be balanced by an equal fluid equivalent of the piston shaft moving out of the system.

Upstream and downstream pipes are preferably connected to the respective ports of the chambers, either of which pipes is adapted for connection to a meter to be proved and a bypass valve in a bypass pipe as preferably provided between the upstream and downstream pipes.

Figure 2:
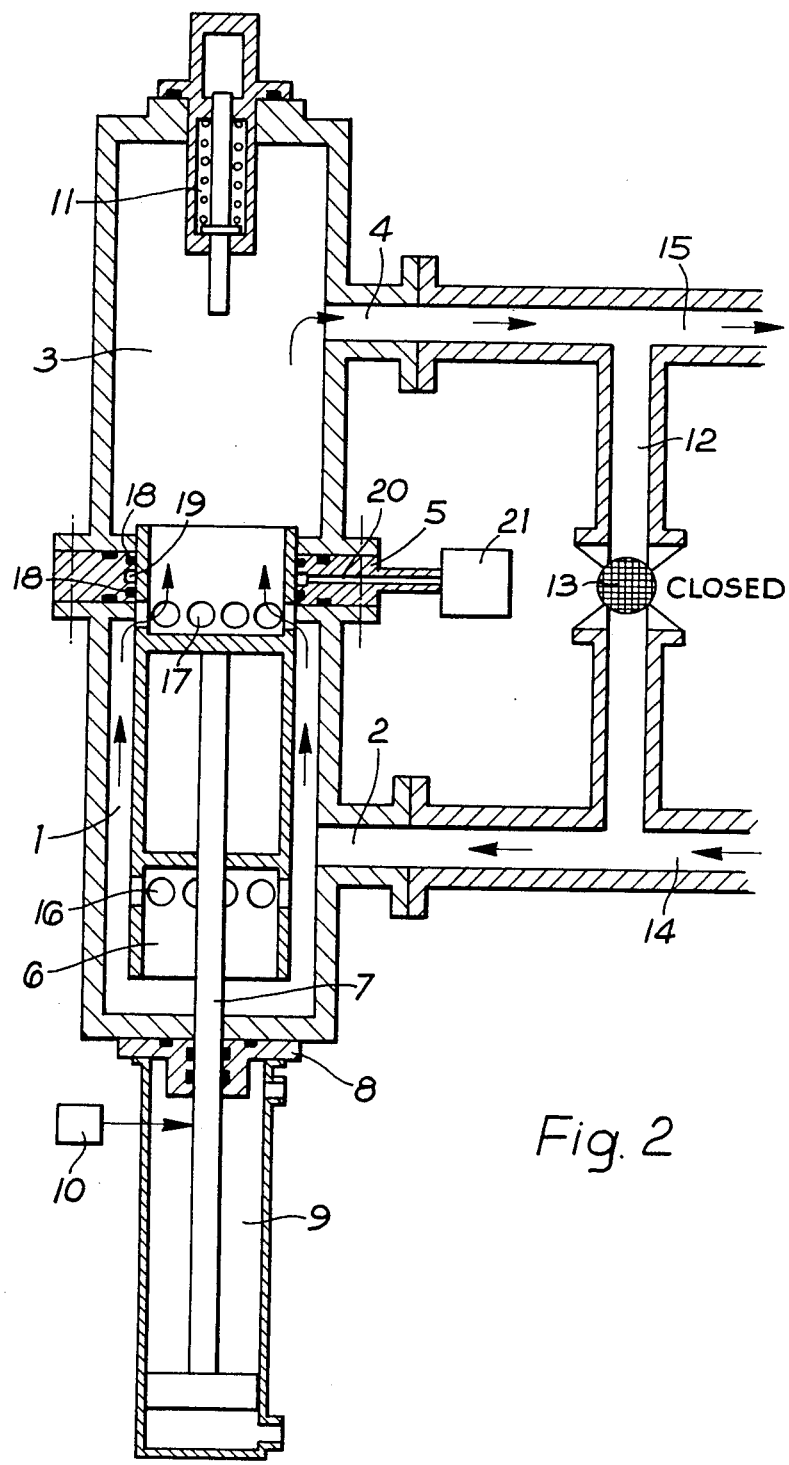
Figure 3:
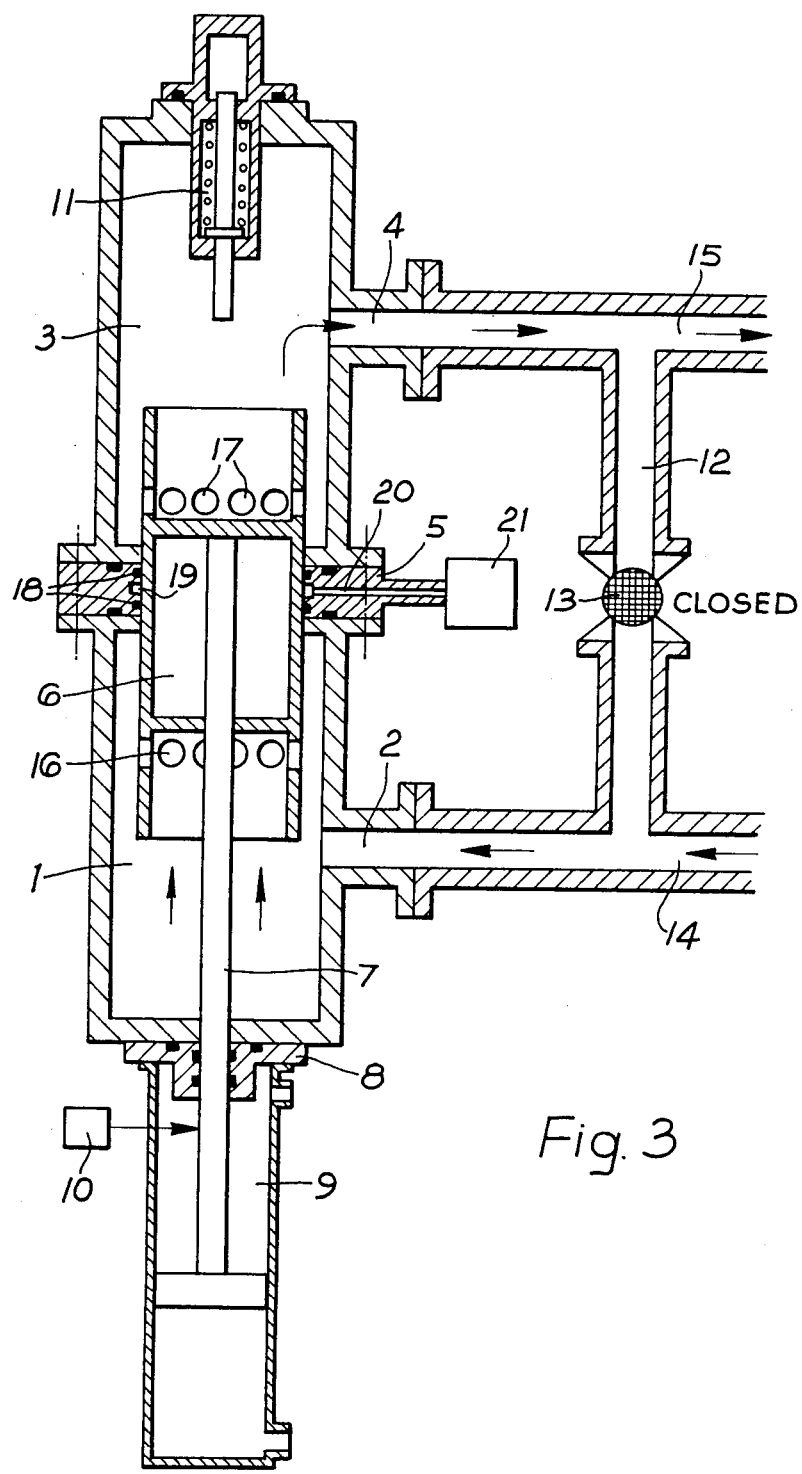
Figure 4:
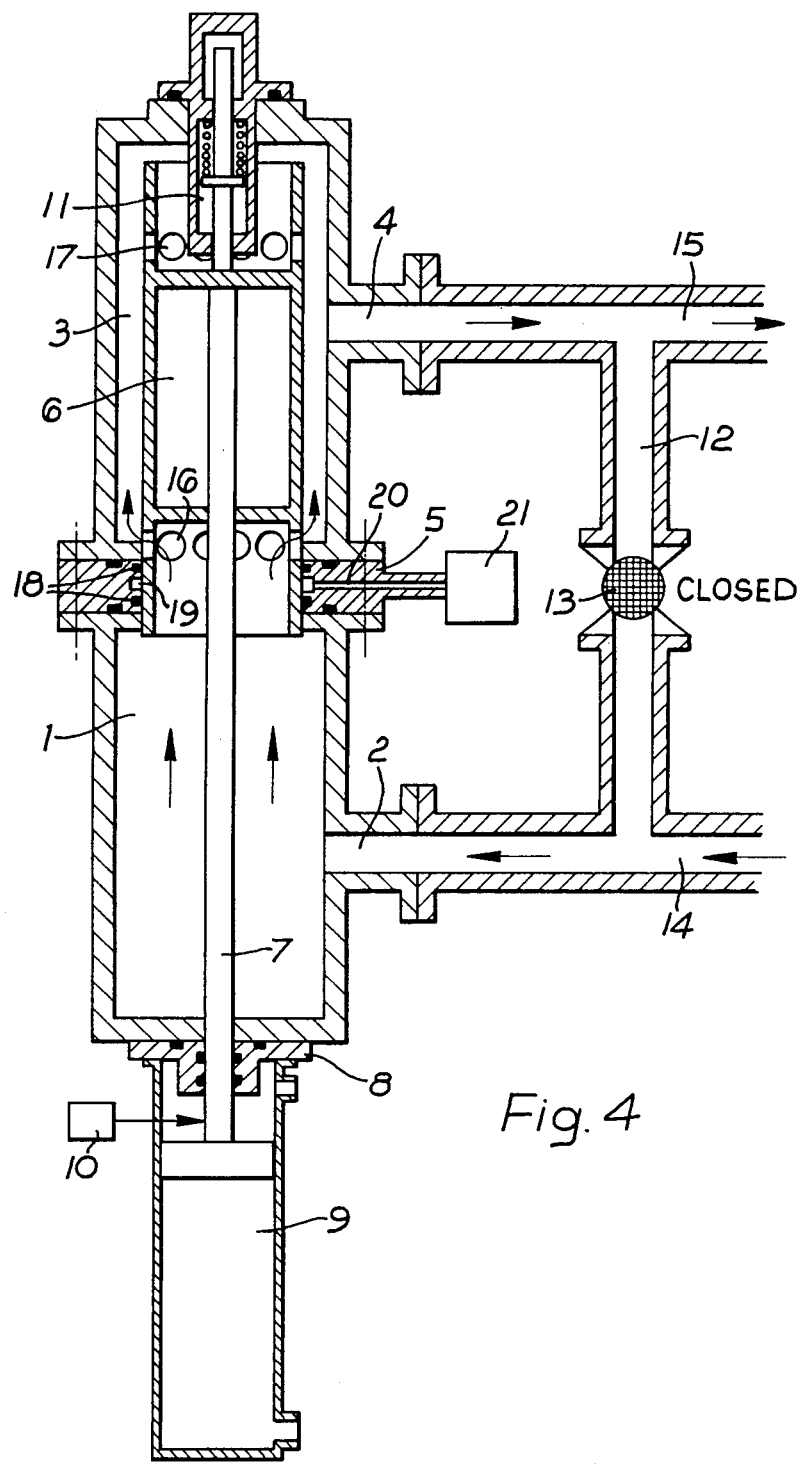
Figure 5:
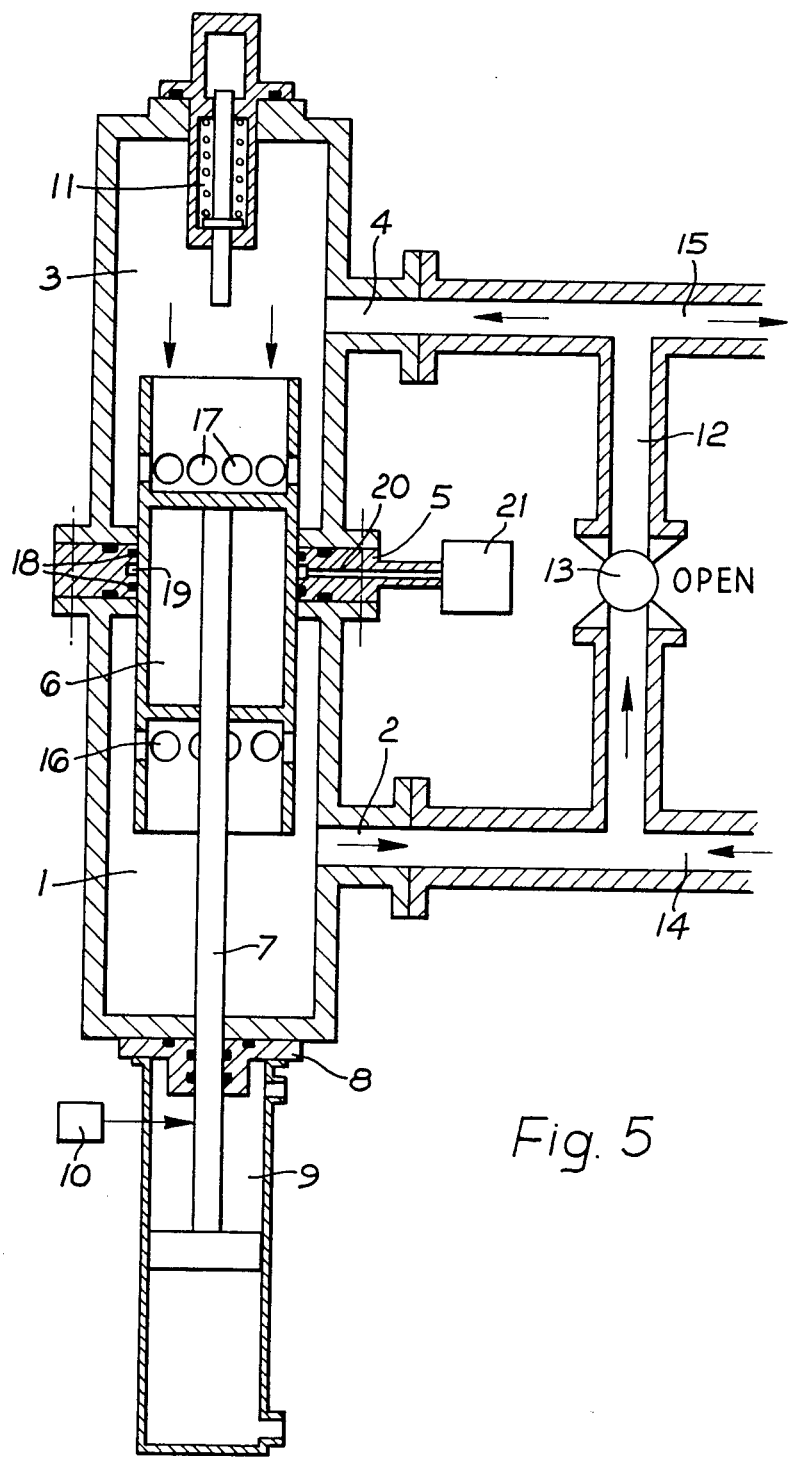
Figure 6:
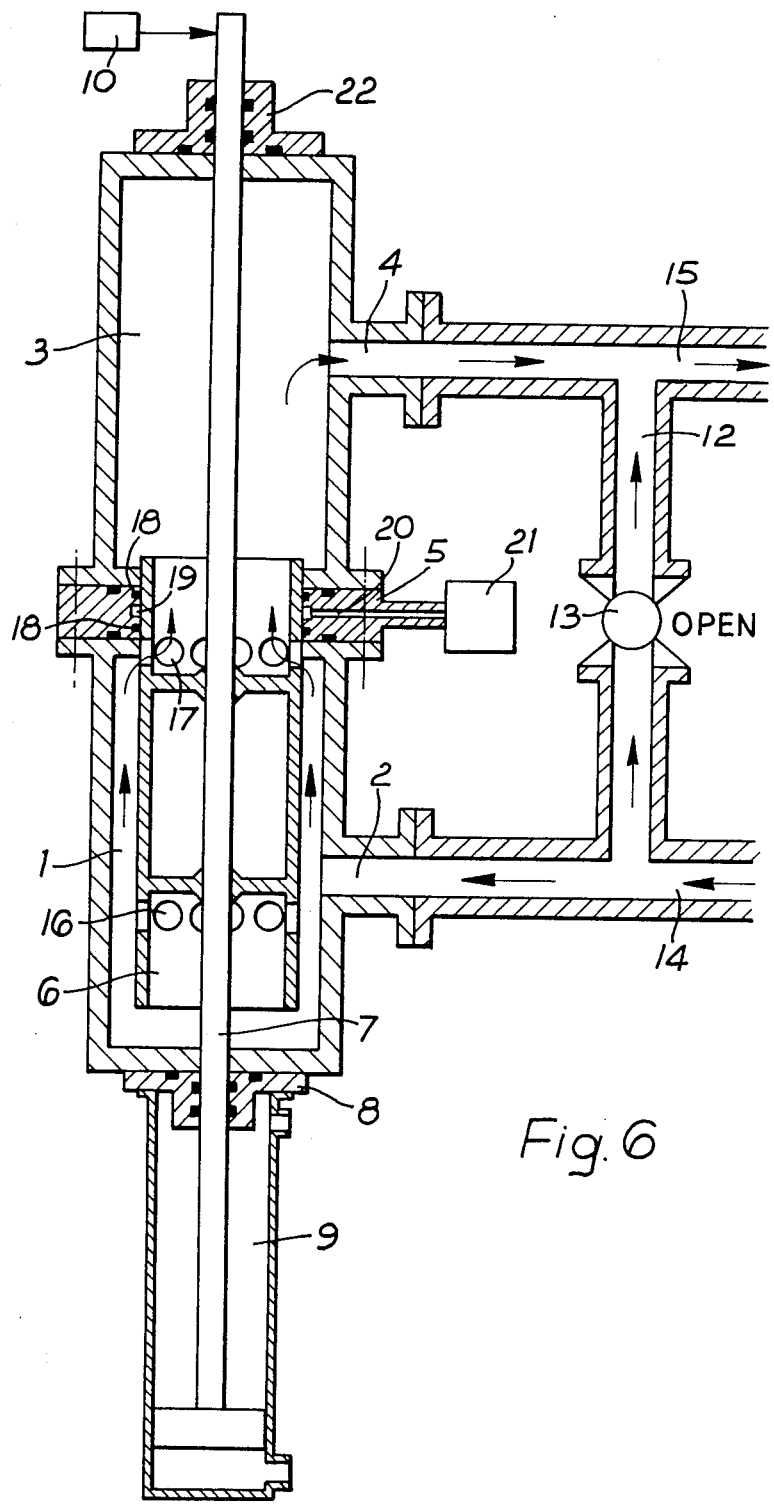

The invention will now be described by way of example only with reference to the accompanying drawings, in which:

FIG. 1 is a diagrammatic axial section of the meter prover in its static position;

FIG. 2 corresponds to FIG. 1 but shows the position of the meter prover at the start of the proving run;

FIG. 3 corresponds to FIG. 1 but shows the position of the meter prover during the proving run;

FIG. 4 corresponds to FIG. 1 but shows the position of the meter prover at the end of the proving run;

FIG. 5 corresponds to FIG. 1 but shows the position of the meter prover during the return; and FIG. 6 corresponds to FIG. 1 but shows an alternative method of supporting the piston body.

In FIG. 1 a meter prover has an upstream chamber 1 with a port 2, a downstream chamber 3 with a port 4, a stationary seal 5 between the chambers 1 and 3, a piston body 6 within and bridging the chambers said piston body attached to a piston rod 7 and being in sealed sliding engagement with the stationary seal 5, a further seal 8 is provided at the end of the upstream chamber 1 through which the piston rod 7 passes, and an independent actuator 9 consisting of a double-acting cylinder with a piston therein secured to the projecting end of the piston rod 7. A detector unit 10 is mounted in the independent actuator 9 for measuring the linear movement of the piston body 6, and to signal the start and end of a proving run. A damper unit 11 at the remote end of the downstream chamber 3 is adapted to arrest the downstream momentum of the piston body 6, and a bypass pipe 12 is provided with a valve 13 between upstream and downstream pipes 14 and 15 connected to the respective ports 2 and 4 of the chambers 1 and 3 either of which pipes 14 and 15 is adapted for connection to the meter to be proved. Relief ports 16 and 17 are provided respectively at the upstream and downstream ends of the piston body 6.

The stationary seal 5 is provided with two sealing rings 18 sealing round the piston body 6 and the means for detecting seal integrity comprises a groove 19 in the seal housing 5 between the sealing rings 18 and a bore 20 from the grooves to a fluid indicator 21, which may be a pressure gauge or a pressure transducer connected to a remote display.

In the operating sequence the meter prover is initially in the static position of FIG. 1 with fluid flowing from the upstream pipe 14 between the upstream chamber 1 and the downstream chamber 3 through the ports 17 in the piston body and also through the open valve 13 in the bypass pipe 12. The valve 13 is then closed, as shown in FIG. 2 allowing fluid flow through the ports 17 only.

The proving run is initiated by applying pressure to the actuator 9 which moves the piston body 6 forward until the ports 17 have passed from the upstream chamber 1 into the seal housing 5 and fluid pressure in the upstream line carries the piston body 6 forward, as shown in FIG. 3, into the downstream chamber 3 and therefore via the downstream pipe 15 through the meter (not shown) being proved. Downstream movement of the piston body 6 continues until, in the position shown at the end of the proving run in FIG. 4, the relief ports 16 pass out from the seal housing 5 into the downstream chamber 3 and relieve the fluid pressure on the piston body 6, and the damper unit 11 arrests its downstream movements. Gate detection signals generated by the detector unit 10 at the start and end of the proving run are analyzed by a meter prover computer (23) together with pulses from the meter being proved to give a readout of a correction factor immediately upon completion of the proving run.

In FIG. 5 the piston body is returned to the starting position of FIG. 1 after opening the valve 13 allowing fluid flow from the upstream pipe 14 to the downstream pipe 15, by applying pressure to the actuator 9 to draw the piston body 6 into the upstream chamber 1.

In the alternative construction shown in FIG. 6 the piston rod 7 projects through the piston body 6 and through a seal 22 in the remote end of the downstream chamber 3 and the detector unit 10 is mounted at the end of the meter prover to coperate with that end of the piston rod 7.

I claim:

1. A meter prover comprising an upstream chamber with one port, a downstream chamber with another port, either port being for connection to a meter to be proved, a piston body within and bridging the chambers, said piston body having an outer diameter less than a minimum inside measurement across each chamber to form a space around the piston body within either chamber, a stationary seal housing projecting radially inwardly of and positioned between the two chambers, and a fixed sealing ring projecting radially inwardly from said housing and in sealed engagement with the piston body, an independent actuator to initiate a proving run of the piston body from one chamber to the other, a detector unit for the start and end of the proving run, and port openings at at least one end of the piston body providing fluid communication between the chambers prior to the onset of the proving run.

2. A meter prover as in claim 1, wherein the piston body is attached to a piston rod which projects through a sealing means at the end of at least one of the two chambers and is connected to the independent actuator external of the chambers.

3. A meter prover as in claim 2, wherein the piston rod projects from the upstream chamber, and a damper unit for the piston body is provided at the remote end of the downstream chamber.

4. A meter prover as in claim 2, wherein the piston rod projects through the piston and through a seal arrangement in the downstrean chamber.

5. A meter prover as in claim 2, wherein the detector unit is mounted selectively at either end of the meter prover to cooperate with that part of the piston rod at that end.

6. A meter prover as in claim 2, wherein the independent actuator is a double-acting cylinder with a piston therein secured to the projecting end of the piston rod from the piston body.

7. A meter prover as in claim 1, wherein means are provided for detecting integrity of the seal between the fixed sealing ring and the piston body.

8. A meter prover as in claim 1 or 2, wherein port openings are provided at the opposite end of the piston body providing fluid communication between the chambers at the end of the proving run.

9. A meter prover as in claim 1, further provided with upstream and downstream pipes connected to the respective ports of the chambers, either of which pipes is adapted for connection to a meter to be proved, a bypass pipe between the upstream and downstream pipes, and a shut-off valve in the bypass pipe.

10. A meter prover comprising an upstream chamber with one port, a downstream chamber with another port, either port being for connection to a meter to be proved, a piston body within and bridging the chambers, said piston body having an outer diameter less than a minimum inside measurement across each chamber to form a space around the piston body within each chamber, a stationary seal between the two chambers comprising a housing having two sealing rings circumferentially circling the piston body, and means for detecting integrity of the seal comprising a groove in the stationary seal between the two sealing rings and a bore from the groove to a fluid indicator, an independent actuator to initiate a proving run of the piston body from one chamber to the other, a detector unit for signaling the start and end of the proving run, and port openings at at least one end of the piston body providing fluid communication between the chambers prior to the onset of the proving run.

11. A meter prover as in claim 10, wherein the fluid indicator is a pressure gauge.

12. A meter prover as in claim 10, wherein the fluid indicator is a pressure transducer connected to a remote display.

13. A meter prover comprising an upstream chamber with one port, a downstream chamber with another port, either port being for connection to a meter to be proved, a piston body within and bridging the chambers, said piston body having an outer diameter less than a minimum inside measurement across each chamber to form a space around the piston body within either chamber, a stationary seal housing projecting radially inwardly of and positioned between the two chambers and a fixed sealing ring projecting radially inwardly from said housing and in sealed engagement with the piston body, an independent actuator to initiate a proving run of the piston body from one chamber to the other, port openings at at least one end of the piston body providing fluid communication between the chambers prior to the onset of the proving run, a detector unit for signaling the start and end of the proving run, and a meter prover computer for analyzing signals from the detector together with pulses from the meter being proved.

14. A meter prover comprising an upstream chamber with one port, a downstream chamber with another port, either port being for connection to a meter to be proved, a piston body within and bridging the chambers, said piston body having an outer diameter less than a minimum inside measurement across each chamber to form a space around the piston body within either chamber, a stationary seal between the two chambers comprising a housing having two sealing rings in sealed engagement with the piston body, means for detecting integrity of said sealed engagement, an independent actuator to initiate a proving run of the piston body from one chamber to the other, port openings at at least one end of the piston body providing fluid communication between the chambers prior to the onset of the proving run, and a detector unit for signaling the start and end of the proving run.

15. The meter prover as in claim 14 wherein said means for detecting seal integrity comprises a groove in the stationary seal between the two sealing rings and a bore from the groove to a fluid indicator.

* * * * *